3,761,453
NITROSO PERFLUORO ADDITION POLYMERS
Robert J. Jones, Hermosa Beach, Calif., assignor to
TRW Inc., Redondo Beach, Calif.
No Drawing. Filed Oct. 27, 1972, Ser. No. 301,284
Int. Cl. C08f 15/34, 15/40, 27/10
U.S. Cl. 260—78.5 R         9 Claims

ABSTRACT OF THE DISCLOSURE

Highly stable compliant polymers are made by reacting a perfluoro alkylene reactant with difluoromaleic anhydride and trifluoronitrosomethane in the presence of a catalyst. These linear perfluoro polymers may be modified by including in the backbone chain a perfluoro compound having a pendant oxy structure. Further modification of linear resins may be obtained by reaction with amine terminated or diisocyanate terminated perfluoro cross-linking compounds to give cured elastomers. Polymerization by simple addition reaction is made to occur by the application of peroxide catalyst. These perfluoro polymers may be used for applications as seals, sealants, films, coatings, and fibers.

The invention herein was made in the course of or under a contract or subcontract thereunder (or grant), with the Department of the Air Force.

BACKGROUND OF THE INVENTION

Perfluorinated polymers are widely used where applications require a high degree of stability with respect to heat and chemicals. Among the most widely known and used perhalogenated polymers are polytetrafluoroethylene and polychlorotrifluoroethylene. One of the disadvantages of these perhalogenated polymers, however, is their inherent cold growth and creep, especially when loads are applied.

U.S. 2,891,968 discloses a copolymer of styrene and difluoromaleic anhydride as an ingredient in formulations for finishes. Another prior art disclosure of difluoromaleic anhydride is found in U.S. 2,831,835 wherein a method of preparing difluoromaleic anhydride is disclosed.

SUMMARY OF THE INVENTION

High performance linear perfluoro polymers are made by reacting difluoromaleic anhydride with a perfluorinated olefinic compound and trifluoronitrosomethane. Polymerization occurs by an addition reaction through the olefinic unsaturation to form long hydrocarbon chains. The reaction may be illustrated as follows:

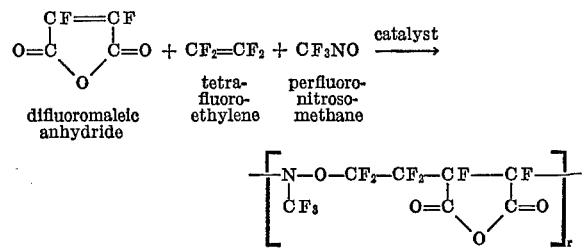

To obtain a broader range of properties, an olefinic perfluoro compound having pendant oxy groups may be included in the reactant so that the oxy compound will situate in the halocarbon backbone chain. This reaction may be illustrated as follows:

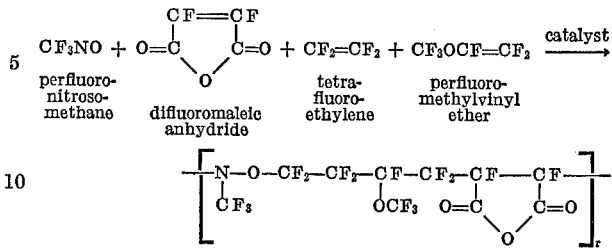

Polymerization occurs by placing the cooled reactants in an enclosed vessel and allowing the reactants to gradually warm. To complete the reaction, moderate heating may be applied during the latter period of the reaction. The polymerization is normally expedited by the use of an organic peroxide catalyst.

The most important modification may be achieved by the inclusion of a perfluorodiamine or a perfluorodiisocyanate terminated cross-linking compound. These compounds react with the anhydride group in the halocarbon chain to provide an imide cross-link between adjacent backbone chains. The reaction may be illustrated as follows:

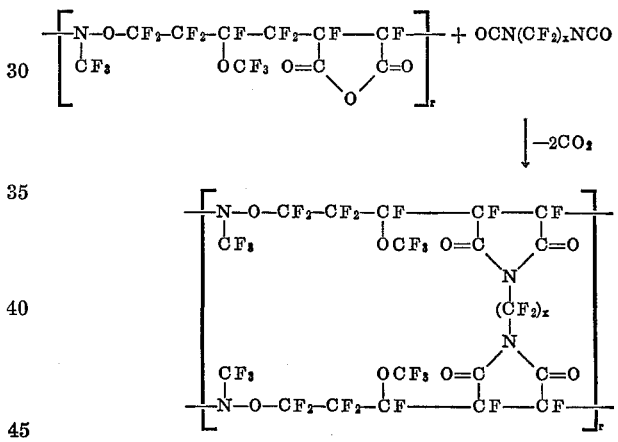

DESCRIPTION OF THE PREFERRED EMBODIMENTS

Addition reaction of a perfluoro olefinic compound with difluoromaleic anhydride and trifluoronitrosomethane produces a linear perfluoro polymer having outstanding chemical and thermal properties. The idealized reaction may be illustrated as follows:

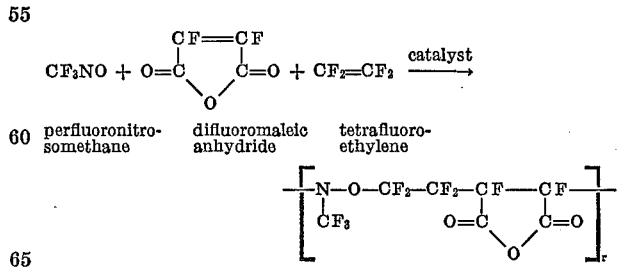

where *r* is an integer from 45 to 2800. Although tetrafluoroethylene is preferred for the perfluoro olefinic compound, other perfluoroalkylenes, having 3 to 6 carbon atoms in their structure, as well as perfluoroalkylenephenyls having 8 to 11 carbon atoms are within the contemplation of this invention. It is also contemplated that short chain perfluoroalkylene isomers may be used.

Product properties of the perfluoro polymer may be modified further by the inclusion of a perfluoro compound having a pendant oxy structure. The perfluoro oxy compound may be either aliphatic having 3 to 6 carbon atoms or aromatic having 8 to 11 carbon atoms and may be either ketones or ethers having the olefinic unsaturation between 1 and 2 carbon atoms of an aliphatic chain or the end carbons of the substituent chain on an aromtaic radical. Thus, for example, the ethers and ketones which may be used in the practice of this invention may be illustrated as follows:

$$CF_3OCF=CF_2$$

Perfluoromethylvinyl ether

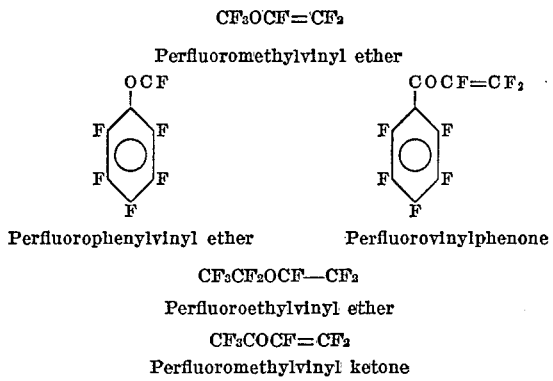

Perfluorophenylvinyl ether   Perfluorovinylphenone $$CF_3CF_2OCF=CF_2$$

Perfluoroethylvinyl ether $$CF_3COCF=CF_2$$

Perfluoromethylvinyl ketone

The idealized reaction may be illustrated as follows:

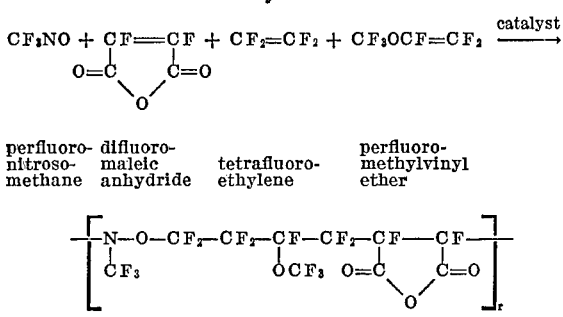

where *r*, again, is an integer from 45 to 2800.

The proportions of the reactants may be varied widely over a range of 1 to 10 mole percent for the difluoromaleic anhydride and 40 to 50 mole percent for the perfluoronitroso alkyl with the remainder comprising perfluoroalkylene or perfluoroalkylenephenyl and/or an oxy perfluoroalkyl vinyl or an oxy perfluoroalkylphenyl vinyl. The perfluoroalkylene, the perfluoroalkylenephenyl, the oxy perfluoroalkyl vinyl, and the oxy perfluoroalkylphenyl vinyl may be present in any combination in the amount of 40 to 50 mole percent. These perfluoroalkylene or oxy perfluoro compounds, singularly or in combination, together with the difluoromaleic anhydride and the perfluoronitroso compounds must equal 100 mole percent.

A key modification of the polymer properties may be effected by treatment of the linear polymer with a perfluorodiamine or a perfluorodiisocyanate. The diisocyanate or the diamine act as cross-linking agents, and react with the anhydride to form an interchain imide linkage. The cross-linking agents may have between 4 and 25 carbon atoms in their molecules. Some specific examples of suitable cross-linking agents are as follows:

$$O=C=N(CF_2)_2O(CF_2)_3N=C=O$$

Bis(2-isocyanoperfluoroethyl) ether

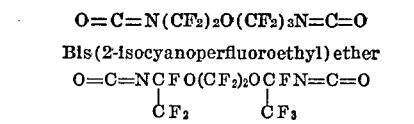

Bis(1-isocyanoperfluoroethoxy)perfluoropentane

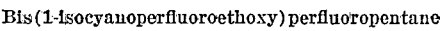

Bis(4-amino-2,3,5,6-tetrafluorophenyl) ether

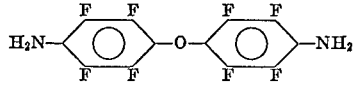

Perfluorobenzidine   Perfluorophenylenediamine

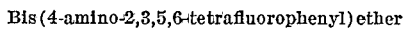

Bis[2-(4-amiophenyl)-1,1′,2,2′-tetrafluoro]oxide

In order to expedite the linear polymerization of the unsaturated perfluoro reactants, an organic peroxide in an amount up to about 5% by weight and preferably about 0.01% to 1% by weight is normally used. Specific examples of a few of the peroxide catalysts are as follows:

(1) Di-t-butyl peroxide
(2) 2,5-dimethyl-2,5-bis(tertiary butylperoxy) hexane
(3) n-Butyl-4,4″-bis(tertiary butylperoxy) valerate
(4) 2,5-dimethyl-2,5-bis(tertiary butylperoxy) hexyne-3
(5) Tertiary-butyl perbenzoate
(6) Dicumyl peroxide
(7) Methyl ethyl ketone peroxide
(8) Cumene hydroperoxide
(9) Di-N-methyl-t-butyl percarbamate
(10) Lauroyl peroxide
(11) Acetyl peroxide
(12) Decanoyl peroxide
(13) t-Butyl peracetate
(14) t-Butyl peroxyisobutyrate When used in this invention, the peroxides are usually dissolved in a halogenated hydrocarbon, for example, dichloromethylene, along with the reactants.

The polymerization process is carried out in a staged reaction sequence to suppress the tetrafluoroethylenetrifluoronitrosomethane cyclic dimer reaction which would predominate if the entire polymerization were run at a moderate temperature. The polymerization may be performed in a temperature range of −40° C. to 120° C. Briefly, the procedure involves allowing the monomers in a suitable solvent to react in a sealed container, under an autogenous or inert atmosphere at a temperature which does not exceed 0° C. for a period of not less than 24 hours. The polymerization is then continued, with or without the presence of free radical type catalysts, at a higher temperature for a period of time governed by the temperature and the nature and concentration of the catalysts, if present.

If cross-linking of the polymer is desired, the cross-linking agent may be added to the polymerization mixture or, preferably, added to the recovered polymer in solution or in bulk. The cross-linking may be performed in solution, sealed reactor and/or press at a temperature not to exceed 200° C. In order to avoid unnecessary clean-up caused by an excess of the cross-linking agent, it is preferred that the mole amount of the cross-linking agent be equal to approximately one-half of the moles of anhydride used, that is, one equivalent of the cross-linking agent should be used for each equivalent of the anhydride. Generally, a slight excess of the cross-linking agent, usually 0.05 mole, is employed to assure complete reaction of all the anhydrides. The cross-linking reaction may be illustrated as follows:

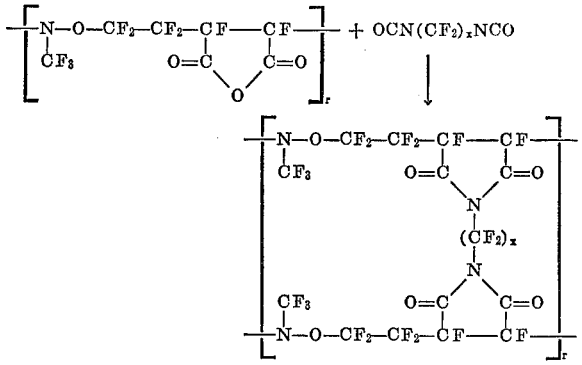

wherein $r$, again, is an integer from 45 to 2800.

The following examples will provide a better understanding of the present invention.

Example I

A 30-ml. stainless steel Hoke pressure tube was charged with a solution of 0.60 gm. (0.0045 mol) difluoromaleic anhydride and 0.04 g. lauroyl peroxide in 9 g. of $CH_2Cl_2$.

The tube was closed with a valved fitting, attached to a vacuum manifold and frozen by immersion in a liquid nitrogen bath. After vacuum degassing the system, 2.05 g. (0.021 mol) of tetrafluoroethylene was distilled through a $H_2SO_4$ scrubber into a calibrated glass vial attached to the manifold and then transferred under vacuum to the Hoke tube. The manifold system was pumped free of gaseous tetrafluoroethylene and a new glass vial was attached. Trifluoronitrosomethane (2.8 g., 0.029 mol) was distilled into the vial, then vacuum transferred to the Hoke tube. The tube was fitted with a pressure transducer and thermocouple, sealed under vacuum and, while still at liquid nitrogen temperature, placed in a cold box maintained at $-20°$ C. The polymerization was run for 64 hours at $-20°$ C., during which time the autogenous pressure in the tube decreased from a high of 250 p.s.i.g. to 17 p.s.i.g. The tube was removed from the cold box and placed in an oven maintained at 50° C. for 72 hours during which time the pressure increased to 70 p.s.i.g. and then gradually decreased to 60 p.s.i.g. The tube was then vented and the polymer was removed from the Hoke tube, washed three times with $CH_2Cl_2$ to remove residual monomers and catalyst, and dried under vacuum at 50° C. for 16 hours. The product so obtained was a colorless, translucent, slightly tacky rubber which exhibited anhydride infrared absorbance at 1775 cm.$^{-1}$ and 1850 cm.$^{-1}$.

Example II

Approximately 0.1 gm. of the terpolymer prepared in Example I was placed in a glass ampule along with 0.04 gm. of a 700 molecular weight perfluorinated diisocyanopolyether. The ampule was sealed under nitrogen and then heated for four hours at 180° C. After opening the ampule excess diisocyanate was removed by heating in a vacuum oven for two hours at 180° C. The recovered terpolymer was more resilient and less tacky than it had been before cross-linking and exhibited a new infrared absorption band (imide) at 1825 cm.$^{-1}$.

Example III

To a dry, 3-necked, 25-ml. round-bottomed flask equipped with a mechanical stirrer and a one atmosphere nitrogen source was added 0.5 gm. of the terpolymer prepared in Example I, 0.03 gm. of an $\alpha,\omega$-diaminophenoxy perfluoroalkylene oxide, and 10 gm. of $C_2Cl_3F_3$. The mixture was stirred for two hours at room temperature and then poured in a small aluminum cup. The cup, containing the solution, was placed in a vacuum oven and after the solvent had evaporated under vacuum at 24° C., the temperature in the oven was increased to 180° C. over a two hour period and then maintained at that temperature for an additional hour. After cooling to room temperature, the recovered cross-linked terpolymer was found to be resilient and no longer soluble in $C_2Cl_3F_3$.

We claim:

1. A nitroso perfluoro composition comprising:

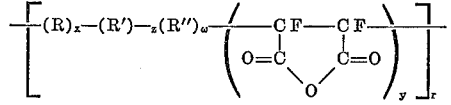

wherein R is selected from the group consisting of:

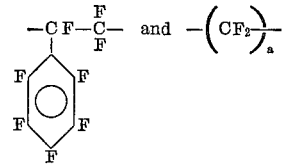

and isomers thereof wherein $a$ is an integer from 2 to 6 carbon atoms; R' is a perfluoro radical having 3 to 6 carbon atoms when aliphatic and 8 to 11 carbon atoms when aromatic and containing a pendant oxy structure selected from the group consisting of ether and ketone; R'' is a perfluoro nitro alkyl having 1 to 3 carbon atoms; $x$ is a mole fraction equal to 0 or ranging from 0.4 to 0.5; $y$ is a mole fraction ranging from 0.01 to 0.1; $z$ is a mole fraction equal to 0 or ranging from 0.4 to 0.5 minus $x$; $\omega$ is a mole fraction ranging from 0.04 to 0.5, the sum of $\omega$, $x$, $y$, and $z$ equal the whole number 1 and $r$ is an integer from 45 to 2800.

2. A composition according to claim 1 wherein the polymeric chains are cross-linked with a perfluoro compound selected from the group consisting of perfluoro aromatic and perfluoro aliphatic diamines and diisocyanates in an amount which is stoichiometric with the anhydride.

3. A composition according to claim 1 wherein $y$ is 0.01 to 0.05.

4. A composition according to claim 1 wherein $a$ is an integer from 270 to 1500.

5. A composition according to claim 1 wherein R is tetrafluoroethylene, and R'' is trifluoronitrosomethane.

6. A composition according to claim 1 wherein R' is perfluoromethyl vinyl ether and R'' is trifluoronitrosomethane.

7. A composition according to claim 1 wherein R is tetrafluoroethylene, R' is a perfluoromethyl vinyl ether, R'' is trifluoronitrosomethane.

8. A composition according to claim 2 wherein the perfluoro compound is perfluorodiaminophenyl ether.

9. A composition according to claim 2 wherein the perfluoro compund is a perfluoro diisocyanether having the structure:

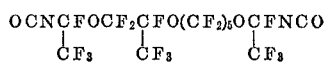

References Cited
UNITED STATES PATENTS

| | | | |
|---|---|---|---|
| 2,891,968 | 6/1959 | Raasch | 260—346.8 |
| 3,380,971 | 4/1968 | Chalmers et al. | 260—78.5 |

JOSEPH L. SCHOFER, Primary Examiner

J. KIGHT III, Assistant Examiner